United States Patent Office 3,532,728
Patented Oct. 6, 1970

3,532,728
PROCESS FOR PREPARING HIGH TEMPERATURE RESISTANT 1,3 - DIAZA-2-SILA-CYCLOALKANE DERIVATIVES
Walter Fink, Zurich, Switzerland, assignor to Monsanto Company, St. Louis, Mo., a corporation of Delaware
No Drawing. Filed Jan. 24, 1966, Ser. No. 522,388
Claims priority, application Switzerland, Jan. 27, 1965, 1,159/65; Apr. 5, 1965, 4,784/65
Int. Cl. C07d *103/02, 7/10*
U.S. Cl. 260—448.2                9 Claims

ABSTRACT OF THE DISCLOSURE 1,3-diaza–sila-cycloalkanes of the formula

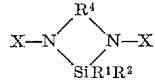

made by heating a compound of the formula X—NH—R$^4$—N(X)SiR$^1$R$^2$R$^6$ in the presence of a catalyst to cleave R$^6$H and cause cyclization. The novel compounds are useful as heat transfer agents, hydraulic fluids, lubricants, anti-foamers, water repellants, and anti-oxidants.

---

The present invention relates to a process for preparing high temperature resistant 1,3-diaza-2-silia-cycloalkane derivatives of the general formula (I)

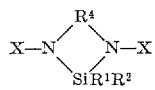

wherein R$^1$ and R$^2$, when taken singly, represents identical or different alkyls, alkenyls, alkylnyls, cycloalkyls, cycloalkenyls, cycloalkynyls, aralkyls, aralkenyls, aralkynyls, alkaryls, alkenylaryls, alkynylaryls, aryls or heterocyclic groups having up to 24 carbon atoms which can be halogenated especially hydrocarbyl groups and having not more than 8 carbon atoms, a RO group or RS group where, R is alkyl, alkenyl, alkynyl, cycloalkyl, cyclokenyl, cycloalkynyls, aralkyl, aralkenyl, aralkynyl, alkaryl, alkenylaryl, alkynylaryl, aryl having up to 24 carbon atoms which can be fluorinated especially hydrocarbyl groups and having not more than 8 carbon atoms, which can contain further RO groups or RS groups, R$^1$ and R$^2$, when taken together, is a polymethylene ring having up to 7 methylene units linked through the silicon atom, which can be interrupted by oxygen atoms, R$^4$ is an alkylene, cycloalkylene, aralkylene, alkarylene, arylene or divalent heterocyclic, especially hydrocarbylene groups and having up to 8 carbon atoms which has attached the two nitrogen atoms of the 1,3-diaza-2-siica-cycloalkane ring in 1,2- or 1,3- or ortho- or peri-position, respectively, and which can be interrupted by O or S and/or bear substituents such as halogen, O, S, SiR$^1$R$^2$R$^3$ where R is defined in a similar manner to R$^1$, RY where R is defined as above; Y=O, S, SO or SO$_2$ or R$'_2$N where R$'$=R or SiR$^1$R$^2$R$^3$; and show a further diaza-sila-cycloalkane group, and X is SiR$^1$R$^2$R$^3$ group or a group R$^5$ where R$^5$=alkyl, alkenyl, cycloalkyl, cycloalkenyl, aralkyl, aralkenyl, arkaryl, alkenylaryl, aryl or heterocyclic group having up to 24 carbon atoms, especially hydrocarbyl groups and having up to 8 carbon atoms which can show a further diaza-sila-cycloalkane group.

A compound according to the herein given definition in which R$^1$=R$^2$=X=CH$_3$ has been obtained by reacting 1,2-bis(methylamino)ethane with dimethyldichlorosilane in 10-20% yield. Some further compounds of this class in which X is a hydrocarbyl group have been obtained by an amine exchange reaction between a diamino-diorganosilane and a N,N'-monosubstituted diamine in the presence of a catalyst (ammonium sulfate) at relatively elevated temperatures (100–180° C.) [C. H. Yoder and J. J. Zuckerman, Inorg. Chem. 4, 11(1965)]. R$^4$ has always been an ethylene group in these previously known compounds of this class.

As a representative of a further herein comprised class of compounds in which X is SiR$^1$R$^2$R$^3$, only 1,3-bis-trimethylsilyl-2,2-dimethyl-1,3-diaza-2-sila-cyclopentane has been known up to now. It has been obtained from N,N'-bis-trimethylsilyl-ethylenediamine and dimethyldichlorosilane in the presence of an acid-binding agent (e.g. excess diamine) in 40% yield [F. A. Henglein and K. Lienhard, Makromol. Chem. 32, 218 (1959)]. As a rule, mainly polymeric products are formed. The corresponding aromatic silyl derivates can be securely prepared using this process. According to another previously known method, this compound has been obtained from the dilithium salt of N,N-bis-trimethylsilyl-ethylenediamine and dimethyldichlorosilane.

The preparation of the dilithium salt is troublesome and expensive, so that this process has no practical importance from the technical point of view. Finally, it has been also known to bring to reaction N,N'-bis-trimethylsilyl-o-phenylenediamine, which in occurrence is another intermediary product in the process of invention, with methyldichlorohydrosilane or dimethyldichlorosilane [D. Kummer and E. G. Rochow, Angew, Chem. 75, 207 (1963)]. There are obtained by this method silyl derivatives of the 1,3-diaza-2-sila-benzocyclopentane having on the silicon atom, or nitrogen atom, respectively, of the ring a hydrogen atom by which these are thermally and hydrolytically less stable as compared to the totally silylated products obtainable according to the present process and containing no more functional hydrogen atoms. Aromatic halosilanes cannot be brought to reaction under the same conditions. Although from ethylenediamine and trimethylchlorosilane the corresponding N,N'-tris-trimethylsilylethylenediamine has been prepared [D. Kummer and E. G. Rochow, Z. anorg, allg. Chem. 321, 21 (1963)] it has not been recognized that compounds of this type can be converted into cyclic derivatives by means of certain catalysts. Thus, only the cyclopentane derivative (R$^4$=CH$_2$CH$_2$) containing on its silicon atoms exclusively methyl groups has been hitherto known as a representative of the class of 1,3-diaza-2-sila-cycloalkane derivatives having X=SiR$^1$R$^2$R$^3$, as defined at the beginning. A simple process for preparing such compounds, in particular also for the aromatic representatives, has been missing up to now. The arylsilylated, especially the mixed alkyl-arylsilylated derivatives, possess, however, besides higher boiling points an extended liquid range and greater thermal and hydrolytic resistance.

It has now been found that one can obtain 1,3-diaza-2-sila-cycloalkane derivatives (I) in preponderantly quantitative yields and partly even at low temperatures (30–80° C.) when a silylated diamine of the general formula (II)

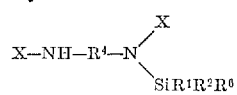

in which X, R$^1$, R$^2$ and R$^4$ are defined as before and R$^6$ is a group derived from a distillable hydrocarbon, preferably having not more than 8 carbon atoms, is treated with a catalyst, preferably sodium hydride, potassium hydride, an organosodium compound or an organopotassium compound, having a sodium-carbon bond, or potassium-carbon bond, respectively.

The reaction of invention proceeds according to the following scheme:

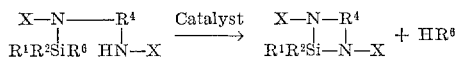

In the preparation of the compounds (II) there can be used diamines showing on an aliphatic chain in 1,2- or 1,3-position primary or secondary amino groups. Consequently, the divalent group $R^4$ can be derived from one of the following hydrocarbons: methane, ethane, propane, butane, pentane, hexane, heptane, octane, nonane, decane, undecane, dodecane, and higher analogues having up to 20 carbon atoms, preferably having not more than 8 carbon atoms. These alkylenes can show alkyls, aralkyls and aryls as substituents, i.e. branched aliphatic diamines like e.g. 1,2 - diamino - 2 - methyl-propane, 2,3-diamino-2-phenyl-butane, 3,4-diamino-3,4-dimethylhexane, 4,4 - bis-aminomethyl-heptane, 5-amino-4-aminomethyl-nonane, 2,4-diphenyl-6,6-bis-aminomethyl-octane etc. are comprised.

Besides the two amino groups necessary for the cyclization, there can be present in another part of the aliphatic chain further amino groups being secondary and especially tertiary ones, such as dimethylamino, diethylamino, di-n-propylamino, di-iso-propylamino, diallylamino, di-n-butylamino, di-iso-butylamino, di-sec-butylamino, di-tert-butylamino, di-3-butenylamino, di-2-butenylamino, di-n-amylamino, di-iso-amylamino, di-iso-octylamino, didodecylamino, dicyclohexylamino, dicyclohexenylamino, dibenzylamino, diphenylamino, ditolylamino, bis(biphenylyl)amino, bis (p-methoxyphenyl)amino, bis(m-phenoxyphenyl)amino, bis(m-trifluoromethylphenyl)amino, N,N,N'-triphenylbenzidino, pyrrolino, pyrrolidino, pyrazolino, piperidino, morpholino, thiazino, N-trimethylsilylpiperazino, tetrahydroquinolino, or decahydroquinolino, including the alkylated, phenylated and silylated derivatives.

If such, additional amino groups are primary or secondary amino groups these are, as a rule, also silylated in the course of the reaction of invention.

Examples of simplest representatives are 1,2,3-triaminopropane, 1,2,3-triamino-2-methylpropane, 1,1,1-trisaminomethyl-ethane, 1,2,3-triamino-2-phenyl propane etc. As the expert will easily recognize, the corresponding bicyclic end products will be obtained if four amino groups are present, each pair being in the defined position, as e.g. in the tetraamino-neopentane and 1,2,3-triamino-2-aminomethylpropane. It is clear that in such cases the amount of silane to be reacted has to be taken correspondingly greater.

Further suitable diamines possess cyclic character and contain the amino groups in ortho-position. The cycloaliphatic representatives can be derived from cyclobutane, cyclopentane, cyclohexane, bicyclopentane, bicyclohexane, spiro-(5,4)-decane etc.

Suitable aromatic diamines are based on benzene, toluene, xylene, naphthalene, 1-methylnaphthalene, 1,4-dimethylnaphthalene, phenanthrene, anthracene, acenaphthene, acenaphthylene, diphenyl, diphenylmethane, triphenylmethane, tetraphenylmethane, dinaphthyl, diphenylamine, triphenylamine, phenyl-trimethylsilane, diphenyldimethylsilane, triphenylmethylsilane, tetraphenylsilane, diphenyloxide, diphenylsulfide, diphenylsulfone, diphenylsulfoxide etc.

Suitable heterocyclic diamines are based on pyrrole, pyrroline, pyrrolidine, furane, tetrahydrofurane, thiophene, pyrazole, pyrazoline, pyrazolidine, imidazole, imidazoline, imidazolidine, benzimidazole, thiazole, oxazole, triazole, benzotriazole, pyrrole, pyrroline, pyrrolidine, pyrane, pyridine, thiopyrane, piperidine, piperazine, morpholine, triazine, indazole, quinoline, quinazoline, quinoxaline, phenazine, carbazole, etc. Included are the alkylated, phenylated and silylated derivatives.

However, among the cyclic diamines also utilizable are those, having in the ortho-position an amino group and an α-aminoalkyl group, such as ortho-aminobenzylamine, 1-amino-2-α-aminoethyl-cyclohexane and 1-amine - 2 - α-aminopropylbenzol.

Moreover, also diamines are utilizable which contain the two amino groups in peri-position, like e.g. 1,8-diaminonaphthalene, 1,8-diaminodecalin, 1,9-diaminoanthracene, 4,5-diaminoquinoline and 1,9-diaminocarbazole.

Besides the additional amino groups further substituents can be: halogen (e.g. 1,3-diamino-2-chloropropane, 1,2-diamino-4-chlorobenzene, 4,5-diamino - 2 - chloropyrimidine, 2,3-diamino-5-(or 6-resp.) chloropyridine, 2,3-diamino-4,5-(or 5,6-resp.) dichloropyridine etc.), oxygen (e.g. diaminoacetone, diaminoacetophenone, diaminobenzophenone), sulfur (e.g. diaminothioketones), SO (e.g. diaminosulfoxides) and $SO_2$ (e.g. diaminosulfones). A further diaza-sila-cyclo-alkane group can be present as a substituent, or be formed in the reaction.

Especially high temperature resistant end products having an elevated boiling point contain a divalent group $R^4$ derived from one of the following compounds: phenoxybenzene, toloxybenzene, 2-biphenylylether, 3-biphenylylether, 4-biphenylylether, 2-biphenylyl-4-biphenylylether, 3-biphenylyl-4-biphenylylether, 1 - (2 - biphenylyloxy)-2-phenoxybenzene, 1-(2-biphenylyloxy)-3-phenoxybenzene, 1 - (3-biphenylyloxy)-2-phenoxybenzene, 1-(3-biphenylyloxy)-3-phenoxybenzene, 1-(3-biphenylyloxy)-4-phenoxybenzene, 1-(4-biphenylyloxy)-2-phenoxybenzene, 1-(4-biphenylyloxy)-3-phenoxybenzene, 1 - (4-biphenylyloxy)-4-phenoxybenzene, 2,2'-diphenoxybiphenyl, 3,3'-diphenoxybiphenyl, 4,4'-diphenoxybiphenyl, 2,3'-diphenoxybiphenyl, 2,4'-diphenoxybiphenyl, 3,4'-diphenoxybiphenyl, 2,4-diphenoxybiphenyl, 2,5 - diphenoxybiphenyl, 2,6-diphenoxybiphenyl, 3,4 - diphenoxybiphenyl, 3,5 - diphenoxybiphenyl, 1,2,3-triphenoxybenzene, 1,2,4-triphenoxybenzene, 1,3,5 - triphenoxybenzene, 2 - phenoxyphenylether, 3-phenoxyphenylether, 4-phenoxyphenylether, 2-phenoxyphenyl-3-phenoxyphenylether, 2-phenoxy - 4' - phenoxyphenylether, 3-phenoxyphenyl - 4' - phenoxyphenylether, 1-phenoxynapthalene, 2 - phenoxynaphthalene, 1,1'-dinaphthalenether, 2,2' - dinaphthalenether, 1,2' - dinaphthalenether etc., moreover longer chain polyaroxyaryls $$ArO(ArO)_bAr$$

wherein Ar signifies a phenyl, biphenyl or naphthyl which can be substituted by lower alkyl groups and $b$ is an integer of 1 to 8. The aroxy groups may be attached in the ortho-, para- or meta-position with respect to the nitrogen atoms of the diamines. Moreover, in the enumerated aryls one or more hydrogen atoms may be replaced by fluorine atoms, thereby the liquid range of the end-products can be increased. Also included are the sulfur ethers containing sulfur in the place of oxygen.

When in the compound (II) one of the groups X or both the groups X represent a hydrocarbyl group, the following diamines have to be considered as starting materials:

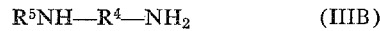

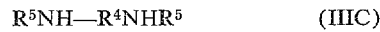

In order to reach the cyclic derivatives, three or two silyl groups, respectively, have to be introduced in the compounds (IIIA) and (IIIB), whereas the compound (IIIC) needs only one of such a group. A symmetric disilyl derivative derived from a primary diamine (IIIA) gives, for example, no diazasila-cycloalkane derivative under the conditions herein employed.

The silylation of the starting diamines mentioned above can be carried out in known manner with a triorganochlorosilane of the formula (IV)    $R^1R^2R^3SiCl$ or $R^1R^2R^6SiCl$ in which $R^1$ to $R^3$ and $R^6$, are defined as before, in the presence of an acid-fixing agent (e.g. excess diamine, triethylamine).

Examples of the groups $R^1$ to $R^3$, attached to silicon are: alkyls, alkenyls and alkynyls, such as methyl, ethyl, vinyl, ethynyl, n-propyl, iso-propyl, allyl, propenyl, isopropenyl, propargyl, propynyl, n-butyl, sec-butyl, tert-butyl, methallyl, 1-butenyl, crotyl, 3-butenyl, butadienyl, 1-butynyl, 2-butynyl, 3-butynyl, 1-buten-2-ynyl and higher aliphatic groups having up to 24 carbon atoms such as undecenyl, dodecyl, myristyl, oleyl, tetracosyl; moreover cycloalkyls, cycloalkenyls and cycloalkynyls such as cyclopentyl, cyclopentenyl, cyclopentadienyl, cyclohexyl, cyclohexenyl, cyclohexadienyl, cyclobenynyl and higher alicyclic rests having up to 12 carbon atoms such as cyclooctyl, cyclooctatrienyl, cyclododecyl, cyclododecatrienyl, bicyclohexyl; moreover aralkyls, aralkenyls, and aralkynyls such as benzyl, cuminyl, phenylethyl, styryl, phenylethynyl phenylpropyl, 1-phenylallyl, 2-phenylallyl, cinnamyl, phenylpropynyl, 1-phenylpropargyl, 3-phenylpropargyl, diphenylmethyl, triphenylmethyl, 1-naphthylmethyl, 2-naphthylmethyl, 1-naphthylethyl, 2-napthylethyl, 1-naphthylethenyl, 2-naphtylethenyl, 1-napthylethynyl, 2-naphthylethynyl; moreover alkaryls, alkenylaryls and alkynylaryls such as tolyl, xylyl, mesityl, duryl, ethylphenyl, cumyl, vinylphenyl, ethynylphenyl, propargylphenyl, propynylphenyl, tert-butylphenyl, 1-vinylnaphthyl, 2-vinylnaphthyl, 1-ethynylnaphthyl, 2-ethynylnaphthyl; morevore aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl, indanyl, indenyl; moreover heterocyclic rests such as pyrryl, furyl, tetrahydrofuryl, benzofuryl, thienyl, pyrrolidyl, pyrazolyl, pyrazolidyl, imidazolyl, imadazolidyl, benzimidazolyl, thiazolyl, oxazolyl, iso-oxazolyl, triazolyl, pyrazinyl, pyrimidyl, pyridazinyl, pyridyl, pyranyl, thiopyranyl, piperidyl, morpholinyl, thiazinyl, triazinyl, quinolyl, quinazolyl, quinoxalyl, indolyl, carbazolyl etc., including the heterocyclic groups having $NSiR^1R^2R^3$ substituents, because it turned out that NH groups present will be also silylated in the course of the simplified procedure of invention (b).

Examples of some simple representatives of the great class of halogenated hydrocarbon groups are: chloromethyl, dichloromethyl, trichloromethyl, bromomethyl, dibromomethyl, tribromomethyl, fluoromethyl, difluoromethyl, trifluoromethyl, 1-chloroethyl, 2-chloroethyl, 1-bromoethyl, 2-bromoethyl, 1-fluoroethyl, 2-fluoroethyl, 1,2-dichloroethyl, 1,2-difluoroethyl, 2-trichloroethyl, 2-trifluoroethyl, pentafluoroethyl, 2-chlorovinyl, 1-chlorovinyl, 1,2 - dichlorovinyl, trichlorovinyl, trifluorovinyl, bromophenyl, fluorophenyl, difluorophenyl, trifluorophenyl, pentafluorophenyl. Other hydrocarbon groups as enumerated above can be halogenated in similar manner.

It has been already stated at the beginning that these groups can be attached through an oxygen atom to the silicon atoms.

Especially useful substituents contain some recurring ether groupings branched or straight chain like methoxymethylenoxy, methoxyethylenoxy, ethoxyethylenoxy, tert-butoxy-tert-butylenoxy, veratroxy, anisoxy, phenetoxy, 3,4 - dimethoxyphenyloxy, 3 - phenoxyphenylenoxy, 3-phenoxy - 4 - methoxyphenenyloxy, 3,4 - diphenoxyphenenyloxy, polymethylenoxy of the general formula $$—O(CH_2O)_bCH_2OR^7$$

wherein $b$ is defined as before and $R^7$ is a radical which forms an ether or ester, such as usually occur as terminal groups in polyoxymethylene compounds; moreover ethylene or propylene can replace the place of methylene.

Other poly(alkyleneether)radicals possess the general formula $—(CH_2CH_2O)_bCH_2CH_2OR^7$ or $$—(CH_2CH_2CH_2O)_bCH_2CH_2CH_2OR^7$$

wherein $R^7$ and $b$ are again defined as above. They are obtained by reacting ethylene oxide or propylene oxide with a hydroxyethyl group or hydroxypropyl group attached to silicon.

Most of the hydrocarbon groups enumerated under the definition of $R^1$ can be attached to nitrogen and therefore may be also considered to be examples of the group X [Formulas I and II] or of the group $R^5$ [Formulas IIIB and C], to the extent that diamines based thereon will be stable enough and able to react.

It has turned out that into a compound of the type (IIIA or B) the last silyl group, i.e. the third or second silyl group respectively, cannot be introduced by means of a triorganochlorosilane in the presence of a base. One has to use the corresponding alkali salt (lithium salt).

It has been found that the silylation or preparation of the intermediate product (II) can be achieved more simply with a triorganohydrosilane of the formula (V)    $R^1R^2R^6SiH$ in the presence of a catalytic amount of alkali hydride. This second method which gives in addition to hydrogen no undesired byproducts, such as amine chlorohydrate, takes place according to the equation:

$$H_2N—R^4—NH_2 + 3R^1R^2R^6SiH \rightarrow$$
$$R^1R^2R^6SiNH—R^4—N(SiR^1R^2R^6)_2 + 3H_2$$

By this method the amines can be silylated surprisingly up to the formation of a tertiary nitrogen atom. Of course, the reaction formulated above can also be carried out stepwise, thereby there can be used in the two first steps another triorganohydrosilane (e.g. triphenylhydrosilane) than in the last step (e.g. trimethylhydrosilane), or even different triorganohydrosilanes in each step. The number of compounds which can be prepared with respect to the substituents on the silicon is considerably increased by this fact. In this second method when using different triorganohydrosilanes, at least one triorganohydrosilane of the formula $R^1R^2R^6SiH$ is used in one of the reaction steps, because at least one of the groups linked to silicon has to be cleavable and is expediently derived from a distillable hydrocarbon which escapes or distills off from the reaction mixture during the reaction. This allows controlling the course of reaction. The group $R^6$ is conveniently selected from methyl, ethyl, vinyl, n-propyl, iso-propyl, allyl, n-butyl, iso-butyl, sec-butyl, tert-butyl and phenyl.

Examples of simplest representatives of suitable triorganohydrosilanes are $Me_3SiH$, $Me_2PhSiH$, $MePh_2SiH$, $Ph_3SiH$, $(MeO)_3SiH$, $Me_2(MeO)SiH$, $Me(MeO)_2SiH$, $(PhO)_3SiH$, $Ph_2(PhO)SiH$, $Ph(PhO)_2SiH$, $Me_2(PhO)SiH$ and $Ph_2(MeO)SiH$. (Me, Ph=methyl, phenyl). Other groups such as enumerated above can be used instead of methyl and phenyl.

It has further been found that the introduction of the last silyl group and the cyclization proceed almost simultaneously if both the reactions are effected by the same catalyst, i.e. by sodium or potassium hydride, or an organometallic compound formed therefrom.

It is understood that both the silylation methods mentioned may be combined and that any other known silylation method, like e.g. the exchange of alkoxyl linked to silicon for amine, are utilizable.

On practising the process according to the scheme (a), a silylated diamine (II), which can be dissolved in an inert solvent, is exposed to the action of a catalyst until the cleavage of the hydrocarbon is terminated. Sodium, potassium, sodium hydride, potassium hydride and the corresponding organometallic compounds having a Na—C or K—C bond, such as sodium-butyl, potassium-phenyl, sodium-naphthalide etc. are especially suitable as catalysts. There can be used also complex hydrides, such as NaBH$_4$, KBH$_4$, NaAlH$_4$, KAlH$_4$ etc. In general, 0.1 to 10 mole percent of the catalyst based on the starting product (II) are sufficient for the reaction, if the catalyst is not consumed in a side-reaction. The cyclization can be further promoted by the presence of strong tertiary amines, such as trimethylamine, triethylamine, N,N'-diethylpiperazine etc., or cobalt chloride, palladium chloride, or colloidal metals, such as cobalt, nickel, copper and platinum. The cyclization may take place fast enough at ambient temperature. In other cases higher temperature up to about 200° C. are convenient or necessary.

One can also start the cyclization at a higher temperature (e.g. 200° C.) and then continue at a lower temperature (e.g. 100° C.). The reaction speed is governed by the reactivity of the starting compound (II), the reaction temperature, the kind and the amount of catalyst and possibly also by the solvent. In general, the cyclization may be finished in about ½ to 4 hours.

In most cases the reaction is carried out without a solvent. When the reaction proceeds very rapidly, a solvent may be advantageous in order to better control the reaction. Suitable solvents are, e.g. aliphatic, aromatic and hydroaromatic hydrocarbons, aliphatic, alicyclic and aromatic ethers, moreover, acetonitrile, adiponitrile, acetone, dimethylsulfone, tetramethylenesulfoxide, dimethylformamide, pyridine, tetramethylurea can also be used.

The course of reaction may be followed by determining the amount of the hydrocarbon (e.g. amount of methane, benzene) which is split off.

On practising the simplified process according to the scheme (b), a diamine (IIIA–C) and a triorganohydrosilane (V) in a molar ratio of preferably at least 1:3, or 1:2, or 1:1, respectively, are heated in the presence of at least a catalytic amount of sodium hydride or potassium hydride, if desired in an inert solvent, until the cleavage of hydrogen and hydrocarbon is finished. The alkali metal hydride always is constantly regenerated during the reaction.

It has been found that also lithium and lithium hydride are catalysts in the preceding silylations. The reaction speed decreases in the range KH>NaH>LiH. The same is true of the alkali metals. These are only applicable instead of the hydrides if they are dissolved by the reaction mixture, i.e. if a hydrogen atom is present which is acidic enough. But, in these cases also the corresponding hydrides will be formed. Lithium and lithium compounds (e.g. lithium hydride, lithium butyl, lithium phenyl) are less suited for the last reaction step, so that the reaction ceases with the compounds (II) in such cases, where otherwise the (last) silylation and cyclization take place simultaneously. The silylation may be followed by determination of the amount of escaping hydrogen.

The purification of the diaza-sila-cycloalkanes in most cases is possible by distillation. Other purification methods, such as reprecipitation, washing with water, etc. are also indicated for the removal of the catalyst.

The products of process are liquid to solid according to the substituents present and to their distribution on the 1,3-diaza-2-sila-cycloalkane ring. Methyl groups, long-chain aliphatic groups (C$_{10}$ to C$_{14}$) and ether groupings generally lower the melting point especially by unsymmetrical substitution. Compounds of the invention having both alkyl and aryl groups tend normally to be liquid, i.e. at 20–25° C. and yet have high boiling points contributing to their utility as heat transfer fluids, and the 1 to 4 carbon atom alkyl groups are especially desirable in these compounds.

The products can be used as heat transferring liquids at high temperatures, lubricants for thermally highly stressed machine parts, hydraulic fluids, agents for textiles, anti-foamants, anti-oxidants, stabilizers, accelerators in vulcanization, plasticizers, hydrophobing agents, absorbers for neutrons etc.

The cyclodisilazanes having unsaturated substituents on the silicon atoms are valuable intermediates, because they can be subjected to addition and polymerization reactions using well-known methods.

EXAMPLE 1

The monolithium salt of N,N'-bis-(trimethylsilyl)-1,2-diaminoethane is prepared in usual manner and brought to reaction with trimethylchlorosilane, giving N,N,N'-tris-(trimethylsilyl)-1,2-diaminoethane in 89% yield. This compound is heated together with about 10 20 mg. of sodium hydride at 180–210° C. and the volume of the escaping hydrogen is determined. The violent reaction is complete in about 15 to 30 minutes. The reaction mixture is fractionally distilled.

Yield 92.5% of 1,3-bis-(trimethylsilyl)-2,2-dimethyl-1,3-diaza-2-sila-cyclopentane; B.P. 36° C./0.03 mm., $n_D^{20}$ 1.4467.

Analysis.—Calc'd for C$_{10}$H$_{28}$N$_2$Si$_3$ (percent): C, 46.10; H, 10.83; N, 10.75; mol. weight 260.5. Found (percent): C, 46.31; H, 10.75; N, 10.68; mol. weight 255.0.

EXAMPLE 2

On reacting N,N'-bis-(trimethylsilyl) - 1,2-diaminoethane with dimethyl-phenyl-hydrosilane in the presence of some sodium hydride or potassium hydride at 80–150° C. one obtains N,N'-bis-(trimethylsilyl)-N-dimethyl-phenyl-silyl-1,2-diaminoethane with evolution of hydrogen.

Yield 87%; B.P. 101°/0.3 mm., $n_D^{20}$ 1.4904.

Analysis.—Calc'd for C$_{16}$H$_{34}$N$_2$Si$_3$ (percent): C, 56.73; H, 10.12; N, 8.27; mol. weight 338.7. Found (percent): C, 56.44; H, 9.75; N, 8.00; mol. weight 324.0.

This compound is heated together with the catalyst at 180–210° C., until the cleavage of methane is terminated.

Yield 98.5% of 1,3-bis-(trimethylsilyl)-2-methyl-2-phenyl-1,3-diaza-2-sila-cyclopentane; B.P. 88° C./0.03 mm., $n_D^{20}$ 1.4947.

Analysis.—Calc'd for C$_{15}$H$_{30}$N$_2$Si$_3$ (percent): C, 55.83; H, 9.37; N, 8.68; mol. weight 332.6. Found (percent): C, 55.81; H, 9.43; N, 8.50; mol. weight 308.0.

EXAMPLE 3

On reacting N,N'-bis-(trimethylsilyl)-1,2-diaminoethane with methyl-diphenyl-hydrosilane in the presence of some sodium hydride at 80–150° C. one obtains N,N'-bis-(trimethylsilyl)-N' - methyl - diphenyl - silyl-1,2-diaminoethane with evolution of hydrogen.

Yield 91%; B.P. 137° C./0.05 mm., $n_D^{20}$ 1.5333.

Analysis.—Calc'd for C$_{21}$H$_{36}$N$_2$Si$_3$ (percent): C, 62.93; H, 9.05; N, 6.99; mol. weight 400.8. Found (percent): C, 62.99; H, 9.10; N, 6.93; mol. weight 385.0.

This compound is heated together with the catalyst at 180–210° C. until the splitting off of methane is complete.

Yield 76%; 1,3-bis-(trimethylsilyl)-2,2-diphenyl-1,3-diaza-2-sila-cyclopentane; B.P. 135–136° C./0.005 mm., $n_D^{20}$ 1.5257.

Analysis.—Calc'd for C$_{20}$H$_{32}$H$_2$Si$_3$ (percent): C, 62.43; H, 8.38; N, 7.28; mol. weight 384.7. Found (percent): C, 62.37; H, 8.05; N, 7.13; mol. weight 379.0.

As a result of the splitting off of benzene there is also formed a small amount of the compound of Example 2.

EXAMPLE 4

A mixture of 3.0 g. (0.5 mole) of 1,2-diaminoethane, 29.7 g. (0.15 mole) of methyl-diphenyl-hydrosilane and about 10 mg. of sodium hydride is heated until no more noticeable evolution of hydrogen occurs. The reaction temperature is increased from 80° C. to 160° C. within 1 to 2 hours. The amount of hydrogen recovered is 99% of theory. The reaction mixture is fractioinally distilled.

Yield 30.8 g. (94%) 1,3-bis-(methyl-diphenyl-silyl)-2-methyl-2-phenyl-1,3-diaza - 2 - sila-cylopentane; B.P. 262° C./0.05 mm.; 96° C. (from hexane).

*Analysis.*—Calc'd for $C_{35}H_{38}N_2Si_3$ (percent): C, 73.63; H, 6.71; N, 4.91; mol. weight 570.9. Found (percent): C, 73.66; H, 6.17; N, 5.16; mol. weight 525.0 (in benzene).

The reaction takes place faster when a greater amount of sodium hydride is used.

EXAMPLE 5

A mixture of 3.71 g. (0.05 mole) of 1,3-diaminopropane, 29.7 g. (0.15 mole) of methyl-diphenyl-hydrosilane and about 12 mg. of sodium hydride is heated until no more noticeable evolution of hydrogen occurs. The reaction temperature is increased from about 80° C. to 180° C. within 1 to 2 hours. The amount of hydrogen recovered is 99% of theory. The reaction mixture is fractionally distilled.

Yield 32.8 g. (98%) of 1,3-bis-(methyl-diphenyl-silyl)-2-methyl-2-phenyl-1,3-diaza-2-sila-cyclohexane; B.P. 254° C./0.04 mm.

*Analysis.*—Calc'd for $C_{36}H_{40}N_2Si_3$ (percent): C, 73.91; H, 6.89; N, 4.79; mol. weight 585.0. Found (percent): C, 73.85; H, 6.66; N, 4.93; mol. weight 573.0 (in benzene).

EXAMPLE 6

A mixture of 2.16 g. (0.02 mole) of ortho-diaminobenzene, 11.8 g. (0.06 mole) methyl-diphenyl-hydrosilane and about 10 mg. of sodium hydride is heated until no more noticeable evolution of hydrogen occurs. The reaction temperature is increased from 110° to 185° C. within 3 to 4 hours. The amount of hydrogen recovered is 96% of theory. After cooling, hexane is added and the crystals are separated by filtration. The product is analytically pure after two recrystallizations in cyclohexane (with added charcoal).

Yield 12.65 g. (91%) of 1,3-bis-(methyl-diphenyl-silyl)-2-methyl-2-phenyl - 1,3 - diaza-2-sila-benzocyclopentane; M.P. 232–234° C.

*Analysis.*—Calc'd for $C_{39}H_{38}N_2Si_3$ (percent): C, 74.24; H, 6.07; N, 4.44; mol. weight 630.9. Found (percent): C, 74.10; H, 6.15; N, 4.33; mol. weight 621.3 (in benzene).

EXAMPLE 7

A mixture of 0.90 g. (0.0015 mole) of 1,2-diaminoethane, 15.63 g. (0.06 mole) of triphenyl-hydrosilane and about 10 mg. of potassium hydride is heated until no more appreciable evolution of hydrogen takes place. The reaction temperature is increased from 40° to 120° C. The amount of hydrogen recovered is 96.5% of theory. After washing with hexane and recrystallization in xylene the product is analytically pure.

Yield 9.7 g. (85%) of 1,3-bis-(triphenyl-silyl)-2,2-diphenyl-1,3-diaza-2-sila-cyclopentane; M.P. 315–320° C.

*Analysis.*—Calc'd for $C_{50}H_{44}N_2Si_3$ (percent): C, 79.32; H, 5.86; N, 3.70. Found (percent): C, 79.64; H, 5.90; N, 3.80.

EXAMPLE 8

A mixture of 1.11 g. (0.0015 mole) of 1,3-diaminopropane, 15.61 g. (0.06 mole) of triphenyl-hydrosilane and about 20 mg. of sodium hydride is heated until no more appreciable evolution of hydrogen occurs. The reaction temperature is increased from 70° to 190° C. within 90 minutes. The amount of hydrogen recovered is 93.5% of theory and the amount of benzene 80% of theory. The product is recrystallized in benzene.

Yield 8.5 g. (73.5%) of 1,3-bis-(triphenyl-silyl)-2,2-diphenyl-1,3-diaza-2-sila-cyclohexane; M.P. 302–324° C.

*Analysis.*—Calc'd for $C_{51}H_{46}N_2Si_3$ (percent): C, 79.42; H, 6.01; N, 3.61. Found (percent): C, 79.54; H, 5.73; N, 3.88.

EXAMPLE 9

A mixture of 1.8 g. (0.03 mole) of 1,2-diamino-ethane, 24.0 g. (0.12 mole) of tri-n-butyl-hydrosilane and about 10 to 20 mg. of sodium hydride is heated until no more noticeable evolution of hydrogen occurs. The reaction temperature is increased from about 60° to 240° C. within 6½ hours. The amount of hydrogen recovered is 94% of theory. The reaction mixture is fractionally distilled.

Yield 11.5 g. (64%) of 1,3-bis-(n-tributyl-silyl)-2,2-di-n-butyl-1,3-diaza-2-sila-cyclopentane; B.P. 179° C./0.03 mm. $n_D^{20}$ 1.4731.

*Analysis.*—Calc'd for $C_{34}H_{76}N_2Si_3$ (percent): C, 68.37; H, 12.83; N, 4.69; mol. weight 597.2. Found (percent): C, 68.12, H, 12.53; N, 4.51; mol. weight 578.0 (in benzene).

EXAMPLE 10

A mixture of 2.7 g. (0.036 mole) of 1,2-diamino-propane, 19.9 g. (0.146 mole) of dimethyl-phenyl-hydrosilane and about 10 to 20 mg. of sodium hydride is heated until no more noticeable evolution of hydrogen occurs. The reaction temperature is increased from about 60° C. to 110° C. within 2½ hours. The amount of hydrogen recovered is 96% of theory. The mixture is fractionally distilled.

Yield 8.8 g. (61%) of 1,3-bis-(dimethyl-phenyl-silyl)-2,2-dimethyl-1,3-diaza-2-sila-cyclopentane; B.P. 155° C./0.05 mm. $n_D^{20}$ 1.5316.

*Analysis.*—Calc'd for $C_{21}H_{34}N_2Si_3$ (percent): C, 63.25; H, 8.59; N, 7.03; mol. weight 398.7. Found (percent): C, 63.18; H, 8.57; N, 7.15; mol. weight 386.0.

Also one obtains as in Example 12 the corresponding bicyclic derivative bis-[3-phenyl-dimethyl-silyl-2,2,4- (or 5, resp.) - trimethyl-1,3-diaza-2-sila-cyclopentyl-(1)]-dimethylsilane; B.P. 228–240° C./0.05 mm. (isomeric mixture).

EXAMPLE 11

A mixture of 4.4 g. (0.05 mole) of N,N′-dimethyl-ethylenediamine, 9.9 g. of methyl-diphenyl-hydrosilane and some sodium hydride is kept at 30° C. until the evolution of hydrogen is finished. The amount of hydrogen recovered is 100% of theory. The benzene is distilled off and the mixture fractionally distilled.

Yield 9.8 g. (95%) of 1,2,3-trimethyl-2-phenyl-1,3-diaza-2-sila-cyclopentane; B.P. 110° C./11 mm. $n_D^{20}$ 1.5213.

*Analysis.*—Calc'd for $C_{11}H_{18}N_2Si$ (percent): C, 64.02; H, 8.79; N, 13.57; mol. weight 206.4. Found (percent): C, 63.98; H, 8.70; N, 13.48; mol. weight 202.0 (in benzene).

EXAMPLE 12

A mixture of 4.2 g. (0.07 mole) of 1,2-diamino-ethane, 28.6 g. (0.12 mole) of dimethyl-phenyl-hydrosilane and about 15 mg. of sodium hydride is heated in the course of 2¾ hours gradually from 10° up to 100° C. The amount of hydrogen recovered is 96.5% of theory and the amount of benzene 126% of theory. The mixture is fractionally distilled. One obtains mainly two fractions.

(1) Yield 12.8 g. (46%) of 1,3-bis-(phenyl-dimethyl-silyl)-2,2-dimethyl-1,3-diaza - 2 - sila-cyclopentane; B.P. 145–146° C./0.03 mm., $n_D^{20}$ 1.5343.

*Analysis.*—Calc'd for $C_{20}H_{32}N_2Si_3$ (percent): C, 62.43; H, 8.38; N, 7.28; mol. weight 384.8. Found (percent): C, 62.83; H, 8.20; N, 7.49; mol. weight 385.0.

(2) Yield 10.3 g. of bis-[3-phenyl-dimethyl-silyl-2,2-dimethyl - 1,3 - diaza - 2 - sila-cyclopentyl-(1)]-dimethylsilane; B.P. 210–255° C./0.03 mm., M.P. 75–76° C. (in hexane).

*Analysis.*—Calc'd for $C_{26}H_{48}N_4Si_5$ (percent): C, 56.05; H, 8.68; N, 10.06; Si, 25.21; mol. weight 557.2. Found (percent): C, 56.13; H, 8.53; N, 10.36; Si, 25.33; mol. weight 556.0.

The product has the following structural formula:

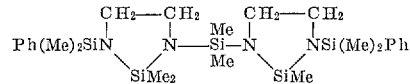

At higher temperature one obtains more of the product (2). On working in a solvent one obtains more of the product (1).

EXAMPLE 13

A mixture consisting of 5.3 g. (0.025 mole) of N,N'-diphenylethylenediamine, 6.5 g. (0.025 mole) of triphenylhydrosilane and about 10 to 20 mg. of sodium hydride or potassium hydride is heated at 160–220° C. until the evolution of hydrogen is terminated. Duration about 42 minutes. The amount of hydrogen recovered is 100%. Hexane or benzene is added to the mixture and the alkali hydride is filtered off. After evaporation of the solvent the remaining is recrystallized in cyclohexane.

Yield 9.0 g. (92%) of 1,2,2,3-tetraphenyl-1,3-diaza-2-sila-cyclopentane; M.P. 233° C.

*Analysis.*—Calc'd for $C_{26}H_{24}N_2Si$ (percent): C, 79.55; H, 6.16; N, 7.14; mol. weight 392.5. Found (percent): C, 79.48; H, 6.01; N, 7.58; mol. weight 381 (in benzene).

EXAMPLE 14

A mixture consisting of 2.9 g. (0.02 mole) of $H_2NCH_2CH_2NHCH_2CH_2NHCH_2CH_2NH_2$, 20.8 g. (0.08 mole) of triphenyl-hydrosilane and about 10 to 20 mg. of sodium hydride or potassium hydride is heated at 50–190° C., until the evolution of hydrogen is finished. Duration about 1½ hours. The amount of hydrogen recovered is 87%. Hexane or benzene is added to the mixture and the alkali hydride is filtered off. After evaporation of the solvent the residue is recrystallized in benzene.

Yield 12.2 g. (79.3%) of 1,2-bis-[3-triphenylsilyl-2,2-diphenyl-1,3-diaza-2-sila-cyclopentyl-(1)]-ethane; M.P. 265–267° C.

*Analysis.*—Calc'd for $C_{66}H_{62}N_4Si_4$ (percent): C, 77.44; H, 6.11; N, 5.47; mol. weight 1023.6. Found (percent): C, 77.21; H, 6.18; N, 5.51; mol. weight 1003 (in benzene).

EXAMPLE 15

A mixture consisting of 4.4 g. (0.03 mole) of $H_2NCH_2CH_2NHCH_2CH_2NHCH_2CH_2NH_2$, 23.8 g. (0.12 mole) of methyldiphenyl-hydrosilane and about 10 to 20 mg. of sodium hydride or potassium hydride is heated at 20–160° C., until the evolution of hydrogen is finished. Duration about 42 minutes. The amount of hydrogen recovered is 98%. Hexane or benzene is added to the mixture and the alkali hydride is filtered off. The filtrate is fractionally distilled.

Yield 21.1 g. (68%) of 1,2-bis-[3-methyl-diphenyl-silyl - 2 - methyl - 2 - phenyl-1,3-diaza-2-sila-cyclopentyl-(1)]-ethane; B.P. 347° C./0.04 mm.

*Analysis.*—Calc'd for $C_{46}H_{54}N_4Si_4$ (percent): C, 71.26; H, 7.02; N, 7.23; mol. weight 775.3. Found (percent): C, 71.90; H, 6.89; N, 6.96; mol. weight 810 (in benzene).

The embodiments of the invention in which an exclusive property or privilege is claimed are defined as follows:

1. A process for preparing high temperature resistant 1,3-diaza-2-sila-cycloalkanes of the formula

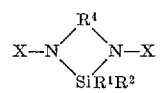

wherein $R^1$ and $R^2$, when taken singly, represent identical or different, alkyl, aralkyl, alkaryl, or aryl groups having up to 24 carbon atoms, $R^4$ is an alkylene, or arylene group having up to 8 carbon atoms which is attached to the two nitrogen atoms of the 1,3-diaza-2-sila-cycloalkane ring in 1,2- or 1,3- or ortho- or peri-position, and X is a $SiR^1R^2R^3$ group where $R^3$ is defined as $R^1$ or a group $R^5$ where $R^5$ is alkyl or aryl group having up to 8 carbon atoms which can additionally have a further diaza-sila-cycloalkane group comprising treating a silylated diamine of the general formula

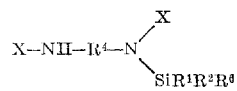

in which X, $R^1$, $R^2$ and $R^4$ are defined as above and $R^6$ is a group derived from a distillable hydrocarbon with a sodium hydride or potassium hydride catalyst at a temperature sufficient to cause cleavage of the hydrocarbon $R^6$ group and cause cyclization.

2. A process of claim 1, comprising treating a diamine of the general formula $$H_2N\text{---}R^4NH_2 \text{ or } R^5NH\text{---}R^4NH_2 \text{ or } R^5NH\text{---}R^4\text{---}NHR^5$$

respectively, in which $R^4$ and $R^5$ are defined as above, with a triorganohydrosilane of the general formula

in which $R^1$, $R^2$ and $R^6$ are defined as above, in a molar ratio of at least 1:3, or 1:2, or 1:1, respectively, in the presence of a catalytic amount of sodium hydride or potassium hydride, at a temperature sufficient to cause cleavage of hydrogen and hydrocarbon.

3. A process of claim 1 wherein the reaction is carried out in an inert solvent.

4. A process of claim 1 wherein $R^1$ and $R^2$ are each hydrocarbyl having not more than 8 carbon atoms, $R^4$ is hydrocarbylene having not more than 8 carbon atoms, one X is an —$SiR^1_3$ group or an $R^1$ group, the other X is an —$SiR^1_3$ group, an $R^1$ group, an

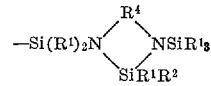

group or an

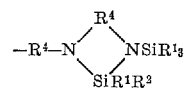

group, and $R^6$ is hydrocarbyl having not more than 8 carbon atoms and derived from a distillable hydrocarbon.

5. A process of claim 1 wherein the catalyst is sodium hydride.

6. A high temperature resistant 1,3-diaza-2-silacycloalkane composition of the formula

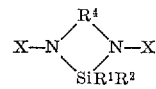

wherein $R^1$ and $R^2$, when taken singly, represent identical or different alkyl, aralkyl, alkaryl, or aryl groups having up to 24 carbon atoms. $R^4$ is an alkylene or arylene group having up to 8 carbon atoms which is attached to the two nitrogen atoms of the 1,3-diaza-2-sila-cycloalkane ring in 1,2- or 1,3- or ortho- or peri-position, and X is a $SiR^1R^2R^3$ group where $R^3$ is defined as $R^1$ or a group $R^5$ where $R^5$ is a diaza-sila-cycloalkane substituted alkyl or aryl group having up to 24 carbon atoms, provided at least one of $R^1$ or $R^2$ is aromatic hydrocarbyl or $R^4$ is arylene.

7. A composition of claim 6 wherein $R^1$ and $R^2$ are each hydrocarbyl having not more than 8 carbon atoms, $R^4$ is hydrocarbylene having not more than 8 carbon atoms, one X is an $SiR^1_3$ group, and the other X is an

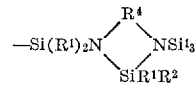

group, an

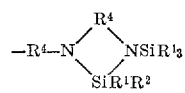

group, or an $SiR^1_3$ group, provided at least one $R^1$ is aryl or $R^4$ is arylene.

8. Normally liquid compositions of claim 7 wherein both X's are —$SiR^1_3$ groups.

9. A normally liquid composition of claim 7 wherein both X's are —$SiR^1_3$ groups, $R^1$ and $R^2$ are alkyl having 1 to 4 carbon atoms or phenyl provided at least one $R^1$ is phenyl, and $R^4$ is alkylene having 2 or 3 carbon atoms.

References Cited

UNITED STATES PATENTS

| | | | |
|---|---|---|---|
| 3,098,830 | 7/1963 | Rochow | 260—2 XR |
| 3,159,668 | 12/1964 | Rochow | 260—448.2 |

OTHER REFERENCES

Yoder et al.: Inorganic Chemistry, vol. 4, No. 1, January 1965, pp. 116–118.

Kummer et al.: Zeitschrift für Anorganische und Allgemeine Chemie, Band 321, 1963, pp. 21–40.

TOBIAS E. LEVOW, Primary Examiner

P. F. SHAVER, Assistant Examiner

U.S. Cl. X.R.

250—108; 252—48.6, 78, 357, 358, 400; 260—239, 267, 268, 283, 290, 293, 302, 309.6, 309.7, 310, 326.8, 329